United States Patent
Li et al.

(10) Patent No.: US 12,527,529 B2
(45) Date of Patent: Jan. 20, 2026

(54) SYSTEMS AND METHODS FOR CONTROLLING PILEUP LOSSES IN COMPUTED TOMOGRAPHY

(71) Applicant: Wisconsin Alumni Research Foundation, Madison, WI (US)

(72) Inventors: Ke Li, Middleton, WI (US); Kevin Treb, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 357 days.

(21) Appl. No.: 18/301,880

(22) Filed: Apr. 17, 2023

(65) Prior Publication Data

US 2024/0341699 A1 Oct. 17, 2024

(51) Int. Cl.
| | |
|---|---|
| *A61B 6/00* | (2024.01) |
| *A61B 6/03* | (2006.01) |
| *A61B 6/42* | (2024.01) |
| *G01T 1/17* | (2006.01) |
| *G06T 11/00* | (2006.01) |

(52) U.S. Cl.
CPC ............ *A61B 6/035* (2013.01); *A61B 6/4233* (2013.01); *A61B 6/4241* (2013.01); *G01T 1/17* (2013.01); *G06T 11/005* (2013.01); *G06T 2210/41* (2013.01); *G06T 2211/444* (2023.08)

(58) Field of Classification Search
CPC ....... A61B 6/032; A61B 6/035; A61B 6/4233; A61B 6/4241; A61B 6/4405; A61B 6/4441; A61B 6/482; A61B 6/5258; A61B 6/585; G06T 11/005; G06T 2211/444
See application file for complete search history.

(56) References Cited

U.S. PATENT DOCUMENTS

2015/0223766 A1* 8/2015 Besson ................. G01T 1/2985
378/62

OTHER PUBLICATIONS

Barradas et al., "Accurate calculation of pileup effects in PIXE spectra from first principles", X-Ray Spectrom. 2006; 35: 232-237.
Frey et al., "Investigation of the use of Photon Counting X-Ray Detectors with Energy Discrimination Capability for Material Decomposition in Micro-Computed Tomography", SPIE Medical Imaging (2007).
Hsieh et al., "The feasibility of a piecewise-linear dynamic bowtie filter", Med. Phys. 40 (3), Mar. 2013.
(Continued)

*Primary Examiner* — Dani Fox
(74) *Attorney, Agent, or Firm* — Quarles & Brady LLP

(57) ABSTRACT

A system and method for producing a computed tomography (CT) medical image includes receiving x-rays passing through an object with a photon-counting detector system, which includes a plurality of detector pixels configured to generate a photon-counting signal in response to receiving each photon of the x-rays having passed through the object. The method also includes summing a charge associated with each photon received at a given detector pixel of the plurality of pixels to generate a charge integration signal, utilizing the charge integration signal to correct a count of the photon-counting signal for pileup-induced count losses to create a corrected photon-counting signal, and reconstructing an image of the object using the corrected photon-counting signal.

17 Claims, 9 Drawing Sheets

(56) References Cited

OTHER PUBLICATIONS

Ji et al., "Anomalous edge response of cadmium telluride-based photon counting detectors jointly caused by high-flux radiation and inter-pixel communication", Phys. Med. Biol. 66 (2021) 085006.

Ji et al., "Development of an integrated C-arm interventional imaging system with a strip photon counting detector and a flat panel detector", IEEE Transactions on Medical Imaging, vol. 40, No. 12, Dec. 2021.

Knoll, G.F., "Radiation Detection and Measurement", Fourth Edition (WSE) John Wiley & Sons Inc. (2010).

Roessl et al., "A Fourier approach to pulse pile-up in photon-counting x-ray detectors," Med. Phys. 43 (3), Mar. 2016.

Szczykutowicz et al., "Design of a digital beam attenuation system for computed tomgraphy: Part I. System design and simulation framework", Med. Phys. 40 (2), Feb. 2013.

Szczykutowicz et al., "Design of a digital beam attenuation system for computed tomgraphy: Part II. Performance study and initial results", Med. Phys. 40 (2), Feb. 2013.

Taguchi et al., "An analytical model of the effects of pulse pileup on the energy spectrum recorded by energy resolved photon counting x-ray detectors," Med. Phys. 37 (8), Aug. 2010.

Taguchi et al., "Enabling Photon Counting Clinical X-ray CT", 2009 IEEE Nuclear Science Symposium Conference Record.

Taguchi et al., Model-based pulse pileup and charge sharing compensation for photon counting detectors: A simulation study, Med Phys. 2022;49:5038-5051.

Taguchi et al., Spectral, Photon Cunting Computed Tomography, Technology and Applications, CRC Press (2020).

Taguchi et al., "Vision 20/20: Single photon counting x-ray detectors in medical imaging", Med. Phys. 40 (10), Oct. 2013.

Taguchi et al.,"Modeling the performance of a photon counting x-ray detecor for CT: Energy response and pulse pileup effects", Med. Phys. 38 (2), Feb. 2011.

Taguchi T. "Energy-sensitive photoncountingdetector-basedX-raycomputed tomography", Radiol PhysTechnol(2017) 10:8-22.

Wang et al., "Pulse pileup statistics for energy discriminating photon counting x-ray detectors", Med. Phys. 38 (7), Jul. 2011.

Wielopolski et al., "Prediction of the Pulse-Height Spectral Distortion Caused by the Peak Pile-Up Effect," Nuclear Instruments and Methods 133 (1976) 303-309.

Johns et al., "Correction of pulse-height spectra for peak pileup effects using periodic and random pulse generators," Nuclear Instruments and Methods in Physics Research A255 (1987) 559-581.

Wielopolski et al., "A Generalized method for correcting pulse-height spectra for the peak pile-up effect due to double sum pulses, Part II. The inverse calculation for obtaining true from observed spectra,"Nuclear Instruments and Methods 140 (1977) 297-303.

\* cited by examiner

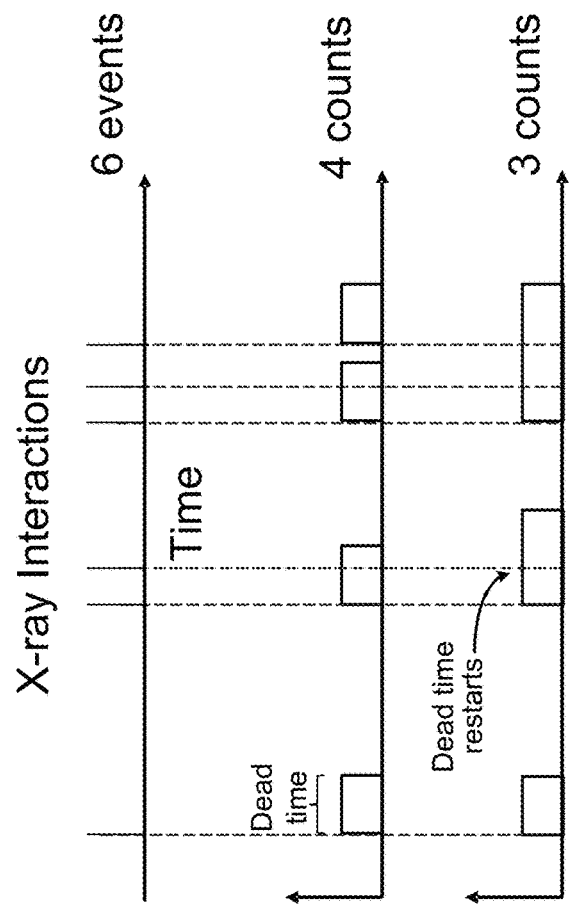
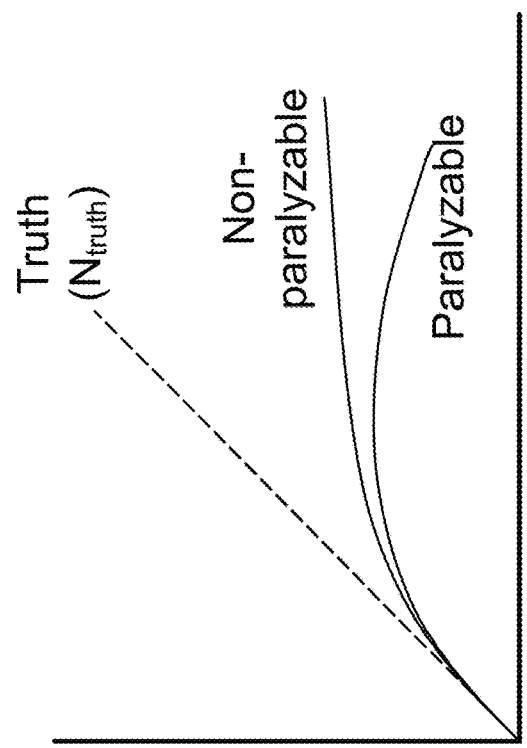
FIG. 1A
FIG. 1B

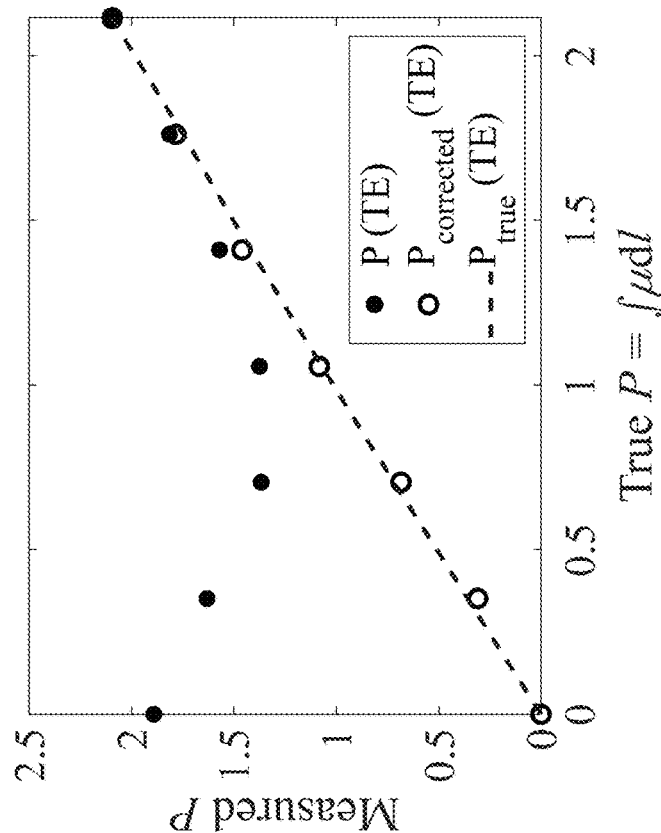
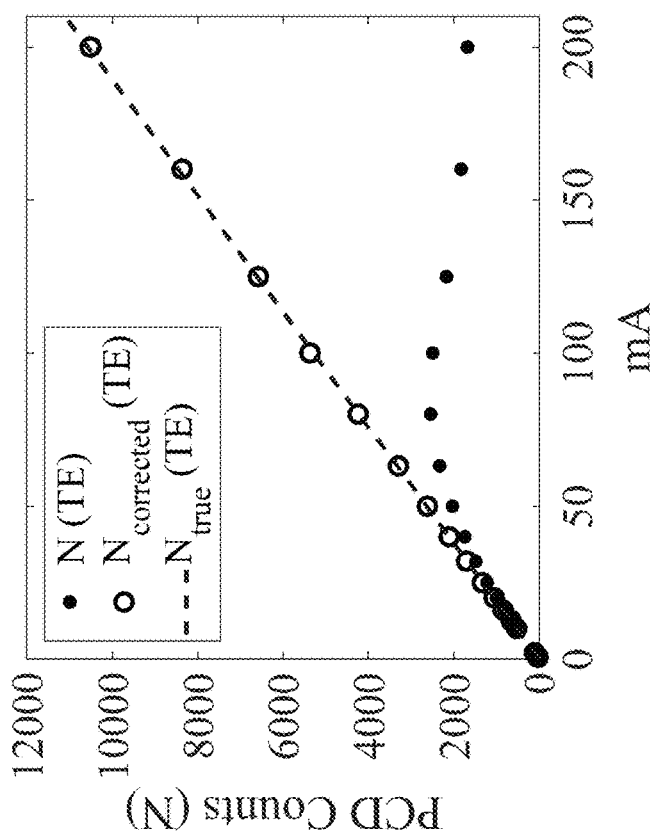
FIG. 6B
FIG. 6A

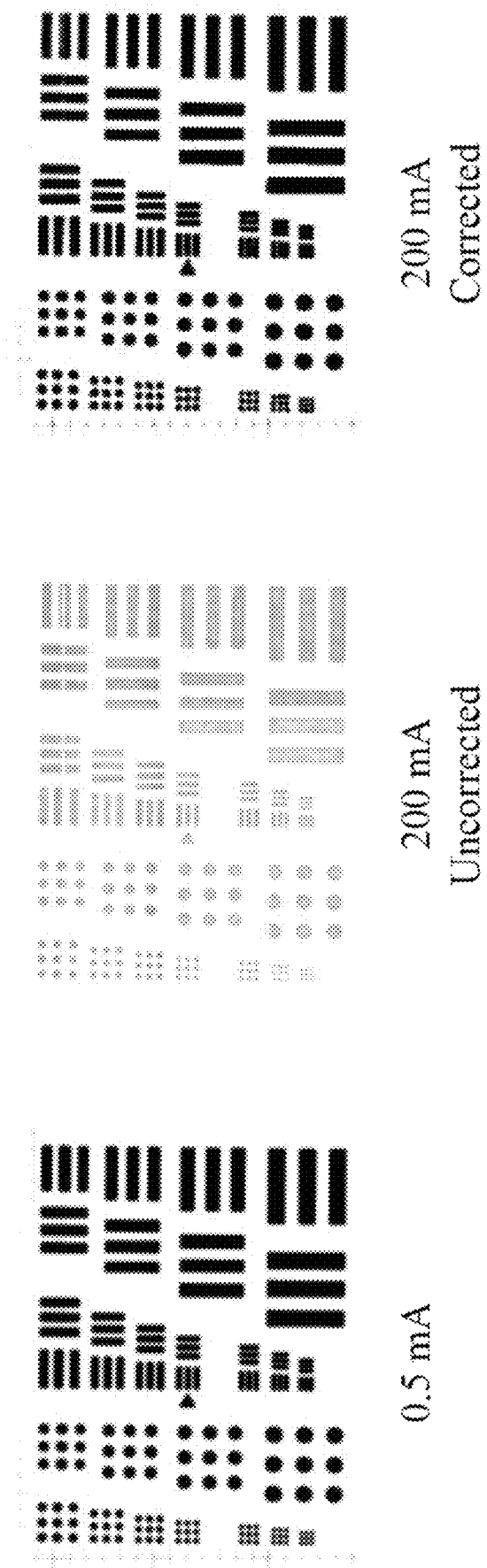

SYSTEMS AND METHODS FOR CONTROLLING PILEUP LOSSES IN COMPUTED TOMOGRAPHY

CROSS-REFERENCE TO RELATED APPLICATIONS

Not applicable.

STATEMENT REGARDING FEDERALLY SPONSORED RESEARCH

Not applicable.

BACKGROUND

The present disclosure relates to systems and methods for improving computed tomography (CT) systems and, more particularly, to systems and methods for controlling pileup losses in CT imaging processes, particularly, those that utilize photon counting (PC) detectors.

In traditional computed tomography systems, an x-ray source projects a beam that is collimated to lie within an X-Y plane of a Cartesian coordinate system, termed the "imaging plane." The x-ray beam passes through the object being imaged, such as a medical patient, and impinges upon an array of radiation detectors. The intensity of the radiation received by each detector element is dependent upon the attenuation of the x-ray beam by the object, and each detector element produces a separate electrical signal that relates to the attenuation of the beam. The linear attenuation coefficient is the parameter that describes how the intensity of the x-rays changes when passing through an object. Often, the "mass attenuation coefficient" is utilized because it factors out the dependence of x-ray attenuations on the density of the material. The attenuation measurements from all the detectors are acquired to produce the transmission map of the object.

The source and detector array in a conventional CT system are rotated on a gantry within the imaging plane and around the object so that the projection angle at which the x-ray beam intersects the object constantly changes. A group of x-ray attenuation measurements from the detector array at a given angle is referred to as a "view" and a "scan" of the object. These views are collected to form a set of views made at different angular orientations during one or several revolutions of the x-ray source and detector. In a two-dimensional (2D) scan, data is processed to construct an image that corresponds to a 2D slice taken through the object. The prevailing method for reconstructing an image from 2D data is referred to in the art as the filtered back-projection (FBP) technique. This process converts the attenuation measurements from a scan into integers called "CT numbers" or "Hounsfield units", which are used to control the brightness of a corresponding pixel on a display.

Over the past 15 years, much effort has been committed to lowering radiation dose for x-ray CT imaging due to the potential cancer risks associated with the use of ionizing radiation in CT. Many efforts have been made to develop and commercialize systems and methods that enable low-dose CT imaging. Primarily, this has yielded noise-reduction algorithms that seek to reduce the inevitable decreases in SNR as the dose is decreased. However, CT hardware with improved radiation dose efficiency, primarily x-ray detectors such as photon counting (PC) detectors, have also been studied and developed to enable low dose CT imaging. Photon counting detector CT (PCD-CT) has been featured as one of the most important advances in low dose CT imaging due to its powerful noise rejection functionality in addition to other advantages such as spectral CT imaging capability. PCD-CT is an emerging technology with the potential to improve clinical CT imaging dramatically. Currently, PCD-CT has been developed by major CT manufacturers for preclinical and, recently clinical evaluations.

In PCD-CT, electric pulses induced by two or more x-ray photons can superimpose (i.e., pileup) when their temporal separation is less than the detector deadtime. Pulse pileups result in not only losses in the recorded counts, but also distortions of the x-ray energy information. Consequently, pulse pileups degrade the quantitative accuracy of both non-spectral and spectral PCD-CT images.

The severity of the pileup effect is fundamentally determined by the x-ray flux level and the PCD deadtime. In clinical CT imaging, a typical flux level is $10^8$ counts per second (cps)/mm$^2$, which requires the deadtime of a PCD with 0.3 mm pixels to be less than 12 ns in order to keep the count loss below 10%. While a short deadtime is achievable in expensive "high-end" PCD-CT systems, it requires semiconductors with high-purity (e.g., high purity CdTe crystals) and ultra-fast comparators for pulse processing, both of which add extensive costs to PCD systems.

For less-expensive PCD-CT system or extending the capabilities of PCD-CT systems to new markets, the deadtime can be 88 ns (single-pixel mode) or 740 ns (anti-coincidence mode), which leads to over 55% count losses at $10^8$ cps/mm$^2$.

Thus, it would be desirable to have systems and methods for CT imaging that allow the benefits of PCD-CT technologies to be extended into new markets and developing countries by addressing the pileup-induced count losses without relying on expensive semiconductors and expensive, but ultra-fast comparators.

SUMMARY

The present disclosure overcomes the aforementioned drawbacks by providing systems and methods for controlling against pileup losses or errors. The systems and methods provided herein are able to utilize information available in photon-counting detectors to generate a charge integration signal that can be used to correct the output of the photon-counting detectors for pileup losses or errors.

In accordance with one aspect of the disclosure, a computed tomography (CT) medical imaging system is provided that includes an x-ray source configured to deliver x-rays to an object as the x-ray source is rotated about the object. The system also includes a photon-counting detector system comprising a plurality of detector pixels configured to receive the x-rays passing through the object and generate a photon-counting signal in response to receiving a photon of the x-rays having passed through the object. The system further includes a charge-integration system configured sum a charge associated with each photon received at a given detector pixel of the plurality of pixels to generate a charge integration signal and a processor. The processor is configured to utilize the charge integration signal to correct a count of the photon-counting signal for pileup-induced count losses to create a corrected photon-counting signal and reconstruct an image of the object using the corrected photon-counting signal.

In accordance with another aspect of the disclosure, a method is provided for producing a computed tomography (CT) medical image includes receiving x-rays passing through an object with a photon-counting detector system, which includes a plurality of detector pixels configured to generate a photon-counting signal in response to receiving each photon of the x-rays having passed through the object. The method also includes summing a charge associated with each photon received at a given detector pixel of the plurality of pixels to generate a charge integration signal, utilizing the charge integration signal to correct a count of the photon-counting signal for pileup-induced count losses to create a corrected photon-counting signal, and reconstructing an image of the object using the corrected photon-counting signal.

The foregoing and other aspects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims and herein for interpreting the scope of the invention.

BRIEF DESCRIPTION OF THE DRAWINGS

FIG. 1A is a graphic illustrating how pileup occurs and results in inaccuracies in photon-counting detector systems.

FIG. 1B is a graph showing the effects of pileup over an imaging timeline.

FIG. 6A is a graph showing measured PCD outputs vs mA both before and after correction in accordance with the present disclosure.

FIG. 6B is a graph showing experimentally measured log-normalized PCD outputs vs. true radiological path length both before and after correction in accordance with the present disclosure.

FIG. 7 is a set of log-normalized images of the spatial resolution test pattern both before and after the proposed correction, and with negligible pileup.

DETAILED DESCRIPTION

As addressed above, pileup-related losses and errors are impediments to further adoption of PCD-CT system. With the goal of reducing these losses, some have attempted to create software-based count loss correction methods, including AI-based algorithms. However, even with such imperfect approaches, a "degeneracy" challenge remains to be addressed. That is, for a given recorded count value in a PCD-CT system, two possible input count levels are possible. On the other hand, in energy-integrating detector (EID) CT systems, this issue is not present.

Figure 1D:
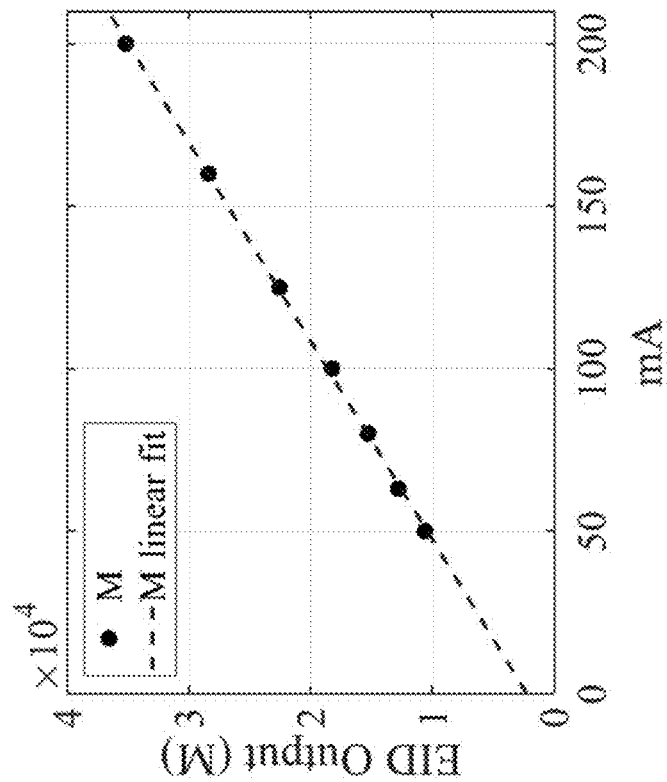
FIG. 1D is a graph showing experimental results of an energy integrating detector over the same tube current as the photon-counting detector experienced in producing FIG. 1C.

In particular, referring to FIG. 1A, a graph of x-ray interactions is shown, where there are 6 x-ray events. However, as illustrated in the second line of the graph, due to dead time of the PCD, only 4 of the 6 events are counted. Furthermore, as illustrated in the third line, a restart of dead time with each event can result in only 3 counts being made, despite there being 6 x-ray events. This can be referred to as a "paralyzable" PCD.

These circumstances, where counts are lost due to dead time, are often referred to as "pileup." Over time, pileup can result in substantial signal errors and degraded images. In particular FIG. 1B, shows that substantial variations between the true amount of x-ray events and what will be detected by a non-paralyzable system and a paralyzable system.

Figure 1C:
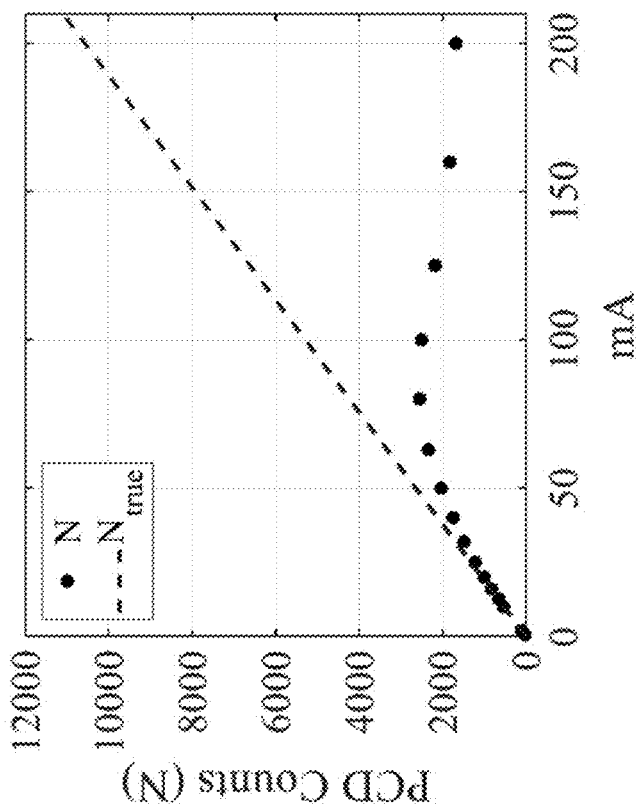
FIG. 1C is a graph showing experimental results of a photon-counting detector experiencing pileup.

Pileup is not a theoretical problem. Referring to FIG. 1C, a plot of experimentally-measured detector outputs vs tube current (mA) is shown for a PCD-CT system. As can be seen, the true count ($N_{true}$) begins to deviate wildly from the actual, measured counts as the tube current increases. The result of such pileup is wasted radiation dose/increased dose, increased image nose, and inaccurate CT numbers. As a result, inaccurate material decomposition results are created, which happens even if counts are not ultimately lost.

On the other hand, referring to FIG. 1B, experimentally-measured detector outputs vs tube current (mA) for an EID-CT system shows that the response of EIDs is linear with respect to the flux without suffering from pileup losses at high flux levels. In EIDs, whether the arrivals of two x-ray photons are close in time does not impact the detector outputs. Energy integration (i.e. charge integration) is much cheaper to implement compared with pulse-mode detection (i.e. photon counting). In PCDs with anti-coincidence corrections, their application-specific integrated circuits (ASICs) already have some charge-integration circuit components.

Of course, EID-CT is not without its faults. It is also important to recognize that the energy (charge) integration mode suffers from electronic noise contamination due to the lack of low signal rejection mechanism. Luckily, at high flux levels that can induce pileups in PCDs, the influence of electronic noise is usually negligible.

Thus, many attempts have been made to at least reduce pileup. For example, some have focused on shortening pulse duration, but this requires expensive hardware (semiconductors) and can distort the acquisition process due to decreased SNR of pulse height and the like. Others have attempted to reduce detector pixel size so that there is less opportunity for pileup, but this increases detector costs and requires compromises in charge sharing, as charge-summing circuits can actually increase dead time and increase pileup effects. Thus, still others have tried using filters and various designs to modulate the fluence field. This, of course, changes the dose profile, which can overly reduce signal, for example, in the periphery, thereby yielding less clinical information, or requiring further dose to the patient.

Overall, attempts to correct for pileup can be categorized as either a hardware system or a software system. Hardware-based pileup correction systems are designed to reduce spectral distortion due to peak pileup. However, the efficacy of such rejectors can be limited, by as much as 50%, because the systems simply remove counts from pileup. Software-based methods attempt to apply analytical pulse-pileup models. However, they require accurate modeling and access to ground truth information and can be nonlinear and shift-variant. In any case, these software-based systems make energy binning more complex and assume that the PCD is non-paralyzable. Thus, such systems have limited success.

The present disclosure provides systems and methods that balance these challenges by leveraging the linear response of charge-integration operation to correct for pileup-induced count losses in PCDs. As will be described, the systems and methods provided herein can be achieved, even with an inexpensive upgrade of the existing ASICs to record the integrated charges. The integrated/summed charges can be used for count correction instead of direct image formation. Furthermore, the collection of EID information does not need to be implemented for each PCD pixel. The systems and methods provided herein do not compromise the single photon counting and energy-discriminating capabilities of PCDs.

In CT imaging, tomographic images of x-ray linear attenuation coefficient, u (x), are reconstructed from the Radon transform of μ, namely $\int \mu(\vec{x})dl$ is estimated from photon events, N, by:

$$\ln\frac{\bar{N}_0}{N} \approx \int \mu(\vec{x})dl. \qquad \text{Eq. (1)}$$

Because the right hand side of Eq. (1) is independent of flux (determined by mA for a given scanner and spectrum), an important assumption of Eq. (1) is that $$\frac{\bar{N}_0}{N}$$

is independent of flux (mA). For the term $\bar{N}_0$ (expected detector counts in an empty (air-only) scan), clinical CT systems usually require its measurement to be done for each spectrum at a relatively low mA level, $mA_{ref}$, below the pileup regime. For an arbitrarily high mA level, its $\bar{N}_0$ can be estimated via:

$$\bar{N}_0(mA) = \frac{mA}{mA_{ref}}\bar{N}_0(mA_{ref}). \qquad \text{Eq. (2)}$$

Therefore, pileup-induced nonlinearity and count loss can be avoided for term $\bar{N}_0$. The real troublemaker is term N (counts measured with the image object). For a paralyzable PCD (such as the experimental PCD used in the experiments described below), N is related to the true photon events, $N_{true}$, by:

$$N = N_{true}\exp\left(-\frac{N_{true}}{T}\tau\right). \qquad \text{Eq. (3)}$$

Here T denotes the PCD deadtime, $N_{true}/T$ is the rate of true photon events. As suggested by the experimental data in FIG. 1C, N is underestimated at high flux/mA levels, which leads to the overestimation of μdl. Further problematic is that $N_{true}$ cannot be explicitly solved from N because one N value can correspond to two possible $N_{true}$ values, as can be seen in FIG. 1C.

Unlike PCDs, the outputs of EIDs, M, are linearly related to $N_{true}$ for a given spectrum, which is one of the important reasons for the success of EIDs in medical CTs in the past 50 years. For both EIDs and PCDs, their signal formations all rely on the conversion of x-ray energy into electric charges. In EIDs, those charges are accumulated in a capacitor during a period of T before they are amplified, digitized, and transferred off the detector. In PCDs, charges induced by each photon event are compared with a threshold to trigger a digital count. However, this does not mean the induced charges can't be integrated over time in a PCD.

Figure 2:
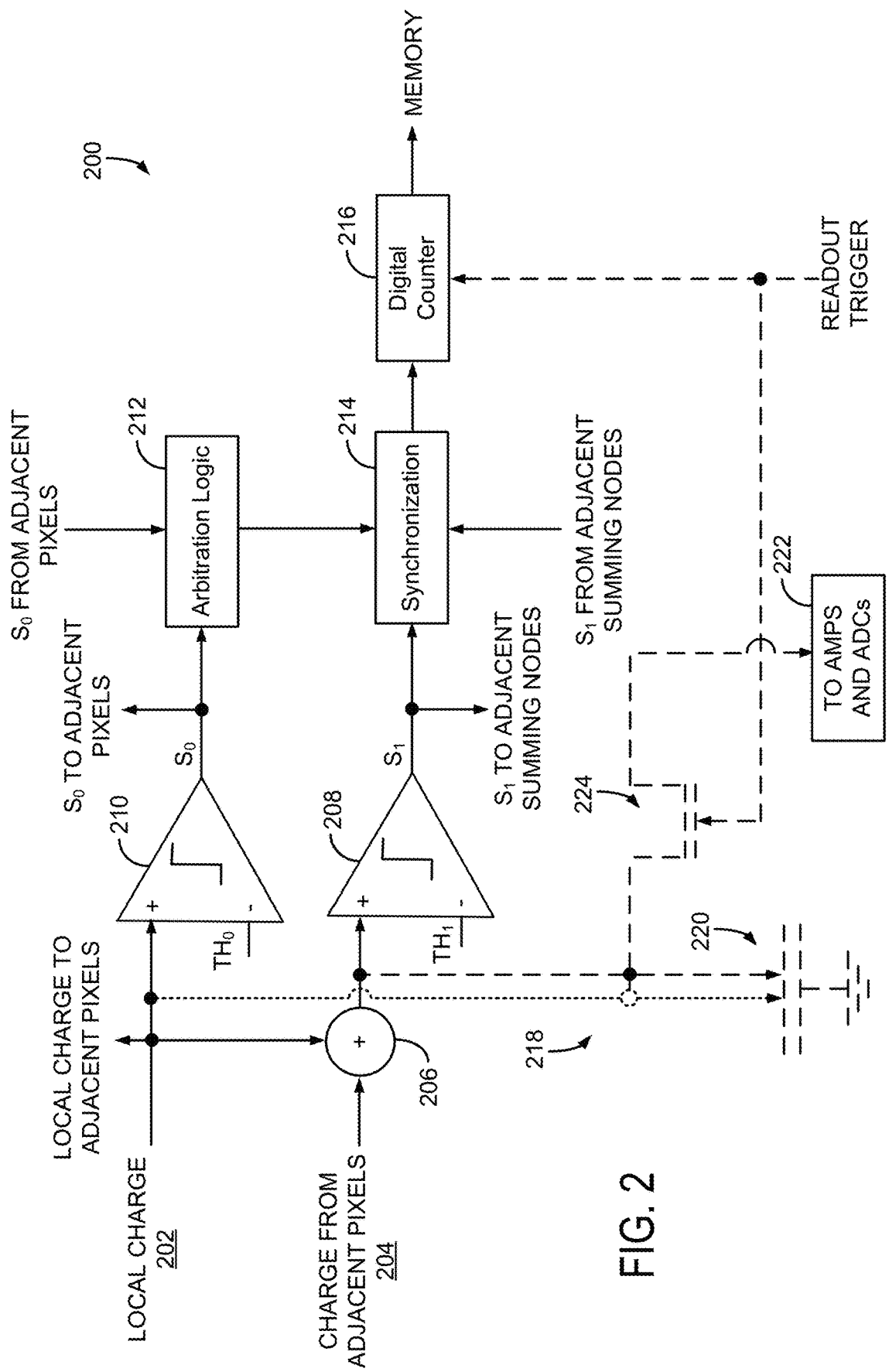
FIG. 2 is a schematic illustration of a system for generating a photon-counting signal and a system for generating a charge integration signal, in accordance with the present disclosure.

Referring to FIG. 2, one example of a PCD system 200 in accordance with the present disclosure is illustrated. The PCD system 200 receives a local charge input 202 and charges from adjacent pixels 204. The PCD system 200 includes an analog device 206 to sum charges induced, for example, at each 2-by-2 pixel block (or 3-by-3, or any other size or any other shape, square or otherwise) for anti-coincidence correction. In particular, the summing device 206 sums the local charge 202 and charges from the adjacent pixels 204 and feeds that sum to a discriminator 208, while just the local charge is delivered to a separate discriminator 210. The respective outputs, as identified in FIG. 2, are $S_1$ and $S_0$. $S_0$ is feed to arbitration logic 212 to be evaluated relative to $S_0$ from adjacent pixels and then passed to a synchronizer 214 for synchronization with $S_1$ from the discriminator 208 and from the adjacent summing nodes. This output is then supplied to a digital counter 216, which registers each counted photon and sends the count for storage in memory.

The present disclosure recognizes that the summed charges from a given pixel block produced by the summing device 206, is, mathematically, an integrated charge detection from the given pixel block and can, therefore, be used to generate a charge integration signal. In many PCD systems, this is information is available from a such a summer. Thus, the present disclosure recognizes that, in many PCD systems 200, such as the non-limiting example illustrated in FIG. 2, energy-integrating information can be derived without requiring separate energy-integrating hardware or integration-mode acquisition.

In accordance with one non-limiting example of the present disclosure, a charge-integration system 218 can be added to the PCD system 200. The circuit can include a storage device 220 to store all charges induced over a given time period. In the illustrated, non-limiting example, a capacitor can be used to store charges induced during T before they are passed to an amplifier and analog-to-digital converter (ADC) to determine an energy-integrated count, such as described above, M.

In some non-limiting examples, the charge-integration system 218 does not need to be installed for every single native pixel. That is, as illustrated, the charge-integration system 218 can be connected to the local charge 202. However, the present disclosure recognizes that the x-ray flux is not expected to have orders to magnitude change at the native detector pixel level. As such, pixel blocks can be used and a charge-integration system 218 may be coupled to each pixel block instead of each pixel, such as the illustrated connection to the summing device 206. As one non-limiting example, if a 2-by-2 pixel block is used, a single charge-integration system 218 can be associated with that block of elements, which can effectively reduce the added circuit cost. Thus, the present disclosure recognizes that, to save costs, amplifiers and ADCs 222 can be shared via a switch 224 across detector rows, similar to the implementation found in existing flat panel EIDs.

Based on the linear, one-to-one correspondence between M and $N_{true}$, a lookup table (LUT), algorithm, equation, or other mechanism can be used that takes N and M as inputs and $N_{true}$ as outputs can be established via a calibration process. As will be described, experiments were performed that establish values for the LUT, which was then used to estimate $N_{true}$ from N and M of unknown objects.

Figure 3:
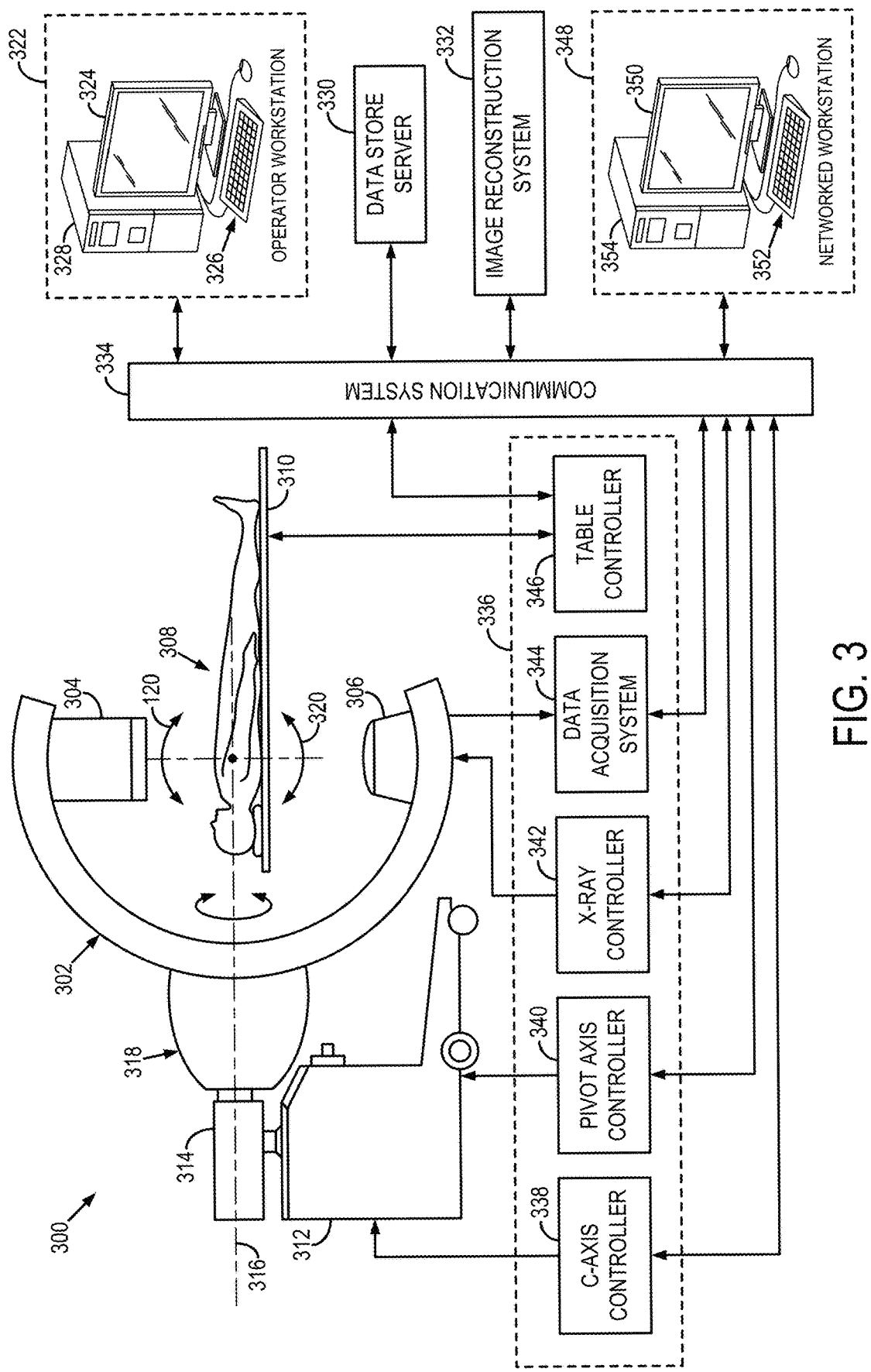
FIG. 3 is a schematic diagram of a C-arm x-ray computed tomography (CT) imaging system configured in accordance with the present disclosure.
Figure 4A:
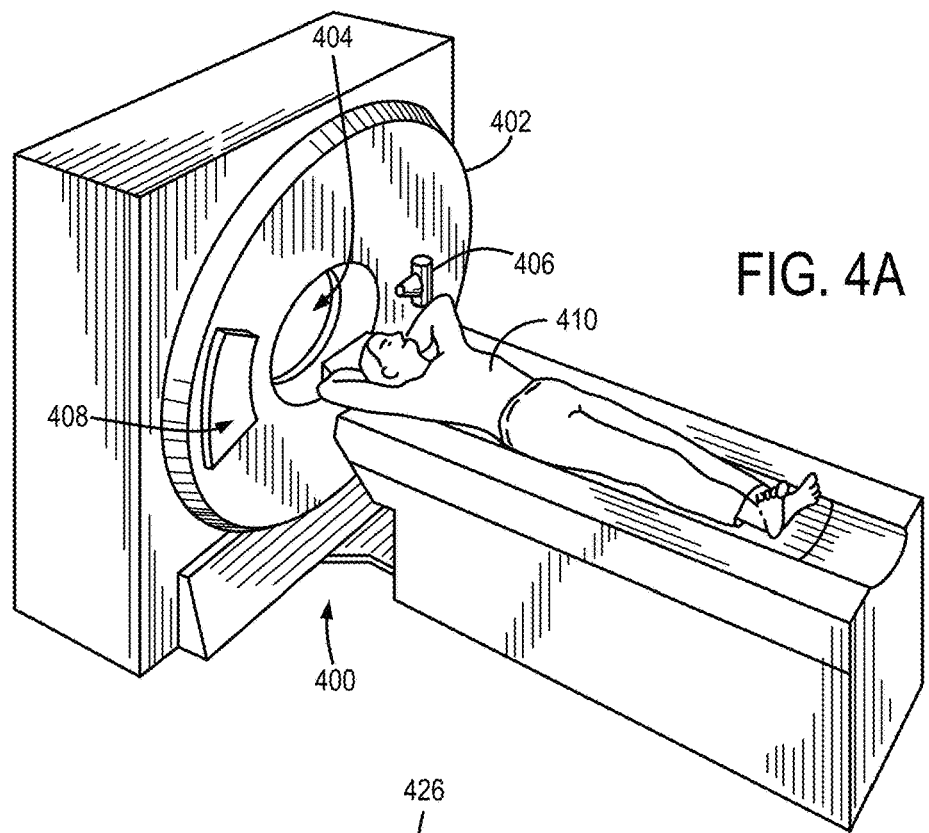
FIG. 4A is a perspective view of an example of an x-ray computed tomography (CT) system.

The systems and methods described above can be utilized in any of a variety of x-ray-based imaging system. Referring to FIG. 3, one, non-limiting example of an imaging system that may be configured in accordance with systems and methods provided in the present disclosure is provided. Specifically, in this example, a so-called "C-arm" x-ray imaging system 300 is illustrated for use in accordance with some aspects of the present disclosure. Such an imaging system is generally designed for use in connection with interventional procedures and or radiation therapy procedures. Such systems stand in contrast to, for example, traditional computed tomography (CT) systems 400, such as illustrated in FIG. 4A, which may also serve as an example of the imaging system for use with the systems and methods of the present disclosure.

Referring again to FIG. 3, the C-arm x-ray imaging system 300 includes a gantry 302 having a C-arm to which an x-ray source assembly 304 is coupled on one end and an x-ray detector array assembly 306 is coupled at its other end. The gantry 302 enables the x-ray source assembly 304 and detector array assembly 306 to be oriented in different positions and angles around a subject 308, such as a medical patient or an object undergoing examination, which is positioned on a table 310. When the subject 308 is a medical patient, this configuration enables a physician access to the subject 308.

The x-ray source assembly 304 includes at least one x-ray source that projects an x-ray beam, which may be a fan-beam or cone-beam of x-rays, towards the x-ray detector array assembly 306 on the opposite side of the gantry 302. The x-ray detector array assembly 306 includes at least one x-ray detector, which will be described below.

Together, the x-ray detector elements in the one or more x-ray detectors housed in the x-ray detector array assembly 306 sense the projected x-rays that pass through a subject 308. Each x-ray detector element produces a signal, such as described above, which represents the specific energy or number of x-rays and, thus, the attenuation of the x-ray beam as it passes through the subject 308. Thus, each x-ray detector element is capable of counting the number of x-ray photons that impinge upon the detector and, when including the charge-integration system 218 described above with respect to FIG. 2, determine the total energy of x-rays for use in controlling pileup, as will be described.

During a scan to acquire x-ray projection data, the gantry 302 and the components mounted thereon rotate about an isocenter of the C-arm x-ray imaging system 300. The gantry 302 includes a support base 312. A support arm 314 is rotatably fastened to the support base 312 for rotation about a horizontal pivot axis 316. The pivot axis 316 is aligned with the centerline of the table 310 and the support arm 314 extends radially outward from the pivot axis 316 to support a C-arm drive assembly 318 on its outer end. The C-arm gantry 302 is slidably fastened to the drive assembly 318 and is coupled to a drive motor (not shown) that slides the C-arm gantry 302 to revolve it about a C-axis, as indicated by arrows 320. The pivot axis 316 and C-axis are orthogonal and intersect each other at the isocenter of the C-arm x-ray imaging system 300, which is indicated by the black circle and is located above the table 310.

The x-ray source assembly 304 and x-ray detector array assembly 306 extend radially inward to the pivot axis 316 such that the center ray of this x-ray beam passes through the system isocenter. The center ray of the x-ray beam can thus be rotated about the system isocenter around either the pivot axis 316, the C-axis, or both during the acquisition of x-ray attenuation data from a subject 108 placed on the table 310. During a scan, the x-ray source and detector array are rotated about the system isocenter to acquire x-ray attenuation projection data from different angles.

The C-arm x-ray imaging system 300 also includes an operator workstation 322, which typically includes a display 324; one or more input devices 326, such as a keyboard and mouse; and a computer processor 328. The computer processor 328 may include a commercially available programmable machine running a commercially available operating system. The operator workstation 322 provides the operator interface that enables scanning control parameters to be entered into the C-arm x-ray imaging system 300. In general, the operator workstation 322 is in communication with a data store server 330 and an image reconstruction system 332. By way of example, the operator workstation 322, data store server 330, and image reconstruction system 332 may be connected via a communication system 334, which may include any suitable network connection, whether wired, wireless, or a combination of both. As an example, the communication system 334 may include both proprietary or dedicated networks, as well as open networks, such as the Internet.

The operator workstation 322 is also in communication with a control system 336 that controls operation of the C-arm x-ray imaging system 300. The control system 336 generally includes a C-axis controller 338, a pivot axis controller 340, an x-ray controller 342, a data acquisition system (DAS) 344, and a table controller 346. The x-ray controller 342 provides power and timing signals to the x-ray source assembly 304, and the table controller 346 is operable to move the table 310 to different positions and orientations within the C-arm x-ray imaging system 300.

The rotation of the gantry 302 to which the x-ray source assembly 304 and the x-ray detector array assembly 306 are coupled is controlled by the C-axis controller 338 and the pivot axis controller 340, which respectively control the rotation of the gantry 302 about the C-axis and the pivot axis 316. In response to motion commands from the operator workstation 322, the C-axis controller 338 and the pivot axis controller 340 provide power to motors in the C-arm x-ray imaging system 300 that produce the rotations about the C-axis and the pivot axis 316, respectively. For example, a program executed by the operator workstation 322 generates motion commands to the C-axis controller 338 and pivot axis controller 340 to move the gantry 302, and thereby the x-ray source assembly 304 and x-ray detector array assembly 306, in a prescribed scan path.

The DAS 344 samples data from the one or more x-ray detectors in the x-ray detector array assembly 306 and converts the data to digital signals for subsequent processing. For instance, digitized x-ray data are communicated from the DAS 344 to the data store server 330. The image reconstruction system 332 then retrieves the x-ray data from the data store server 330 and reconstructs an image therefrom. The image reconstruction system 330 may include a commercially available computer processor, or may be a highly parallel computer architecture, such as a system that includes multiple-core processors and massively parallel, high-density computing devices. Optionally, image reconstruction can also be performed on the processor 328 in the operator workstation 322 or on a mobile system or in the cloud. Reconstructed images can then be communicated back to the data store server 330 for storage or to the operator workstation 322 to be displayed to the operator or clinician.

The C-arm x-ray imaging system 100 may also include one or more networked workstations 348. By way of example, a networked workstation 348 may include a display 350; one or more input devices 352, such as a keyboard and mouse; and a processor 354. The networked workstation 348 may be located within the same facility as the operator workstation 322, or in a different facility, such as a different healthcare institution or clinic.

The networked workstation 348, whether within the same facility or in a different facility as the operator workstation 322, may gain remote access to the data store server 330, the image reconstruction system 332, or both via the communication system 334. Accordingly, multiple networked workstations 348 may have access to the data store server 330, the image reconstruction system 332, or both. In this manner, x-ray data, reconstructed images, or other data may be exchanged between the data store server 330, the image reconstruction system 332, and the networked workstations 348, such that the data or images may be remotely processed by the networked workstation 348. This data may be exchanged in any suitable format, such as in accordance with the transmission control protocol (TCP), the Internet protocol (IP), or other known or suitable protocols.

Figure 4B:
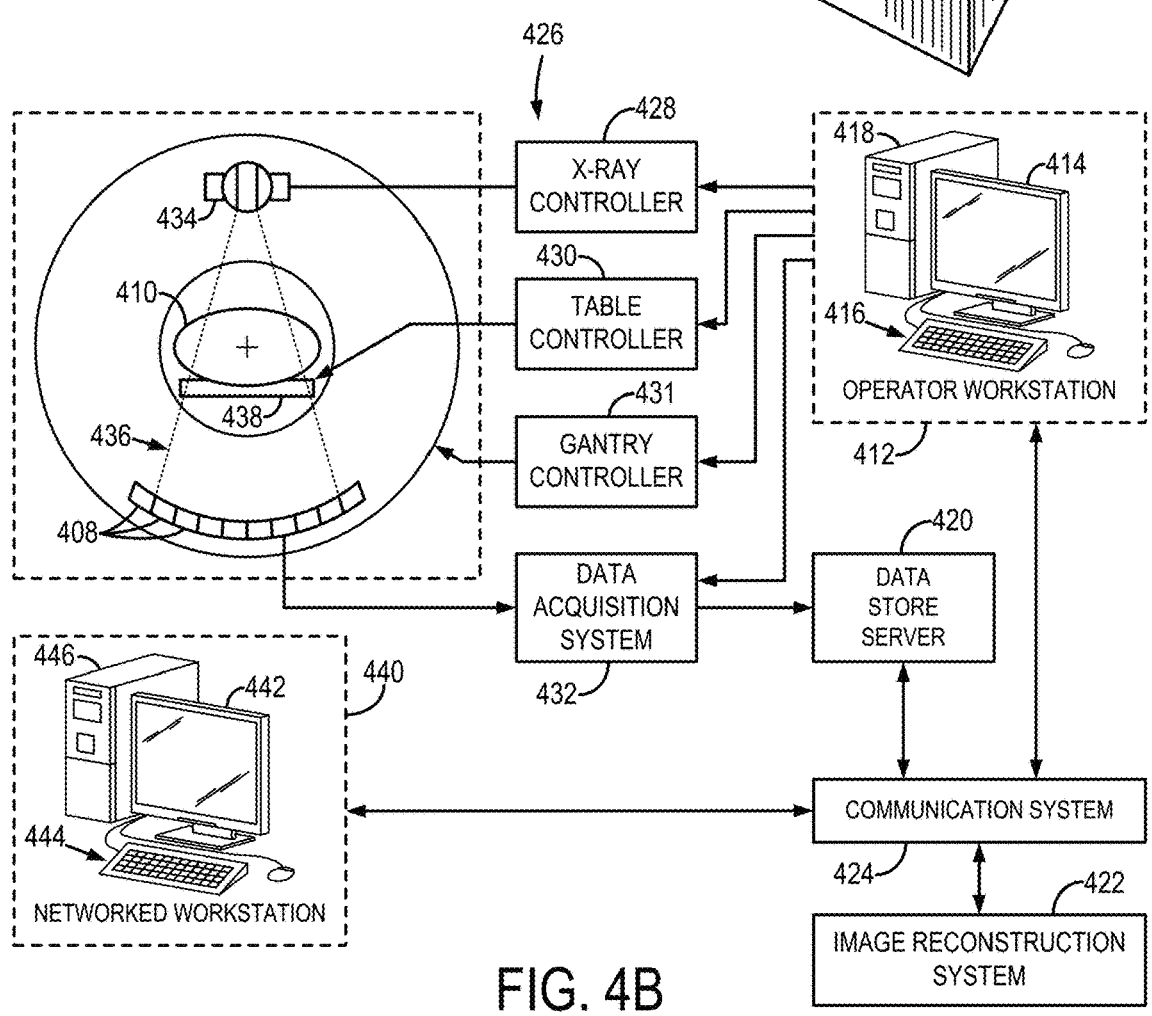
FIG. 4B is a block diagram of CT system, such as illustrated in FIG. 4A.

Similarly, referring to FIGS. 4A and 4B, the imaging system may include a gantry-based CT system 400, which includes a gantry 402 that forms a bore 404 extending therethrough. In particular, the gantry 402 has an x-ray source 406 mounted thereon that projects a fan-beam, or cone-beam, of x-rays toward a detector array 408 mounted on the opposite side of the bore 404 through the gantry 402 to image the subject 410.

The CT system 400 also includes an operator workstation 412, which typically includes a display 414; one or more input devices 416, such as a keyboard and mouse; and a computer processor 418. The computer processor 418 may include a commercially available programmable machine running a commercially available operating system. The operator workstation 412 provides the operator interface that enables scanning control parameters to be entered into the CT system 400. In general, the operator workstation 412 is in communication with a data store server 420 and an image reconstruction system 422 through a communication system or network 424. By way of example, the operator workstation 412, data store sever 420, and image reconstruction system 422 may be connected via a communication system 424, which may include any suitable network connection, whether wired, wireless, or a combination of both. As an example, the communication system 424 may include both proprietary or dedicated networks, as well as open networks, such as the Internet.

The operator workstation 412 is also in communication with a control system 426 that controls operation of the CT system 400. The control system 426 generally includes an x-ray controller 428, a table controller 430, a gantry controller 431, and a data acquisition system (DAS) 432. The x-ray controller 428 provides power and timing signals to the x-ray module(s) 434 to effectuate delivery of the x-ray beam 436. The table controller 430 controls a table or platform 438 to position the subject 410 with respect to the CT system 400.

The DAS 432 samples data from the detector 408 and converts the data to digital signals for subsequent processing. For instance, digitized x-ray data are communicated from the DAS 432 to the data store server 420. The image reconstruction system 422 then retrieves the x-ray data from the data store server 420 and reconstructs an image therefrom. The image reconstruction system 422 may include a commercially available computer processor, or may be a highly parallel computer architecture, such as a system that includes multiple-core processors and massively parallel, high-density computing devices. Optionally, image reconstruction can also be performed on the processor 418 in the operator workstation 412. Reconstructed images can then be communicated back to the data store server 220 for storage or to the operator workstation 412 to be displayed to the operator or clinician.

The CT system 400 may also include one or more networked workstations 440. By way of example, a networked workstation 440 may include a display 442; one or more input devices 444, such as a keyboard and mouse; and a processor 446. The networked workstation 440 may be located within the same facility as the operator workstation 412, or in a different facility, such as a different healthcare institution or clinic.

The networked workstation 440, whether within the same facility or in a different facility as the operator workstation 412, may gain remote access to the data store server 420 and/or the image reconstruction system 422 via the communication system 424. Accordingly, multiple networked workstations 440 may have access to the data store server 420 and/or image reconstruction system 422. In this manner, x-ray data, reconstructed images, or other data may be exchanged between the data store server 420, the image reconstruction system 422, and the networked workstations 412, such that the data or images may be remotely processed by a networked workstation 440. This data may be exchanged in any suitable format, such as in accordance with the transmission control protocol (TCP), the Internet protocol (IP), or other known or suitable protocols.

Figure 5:
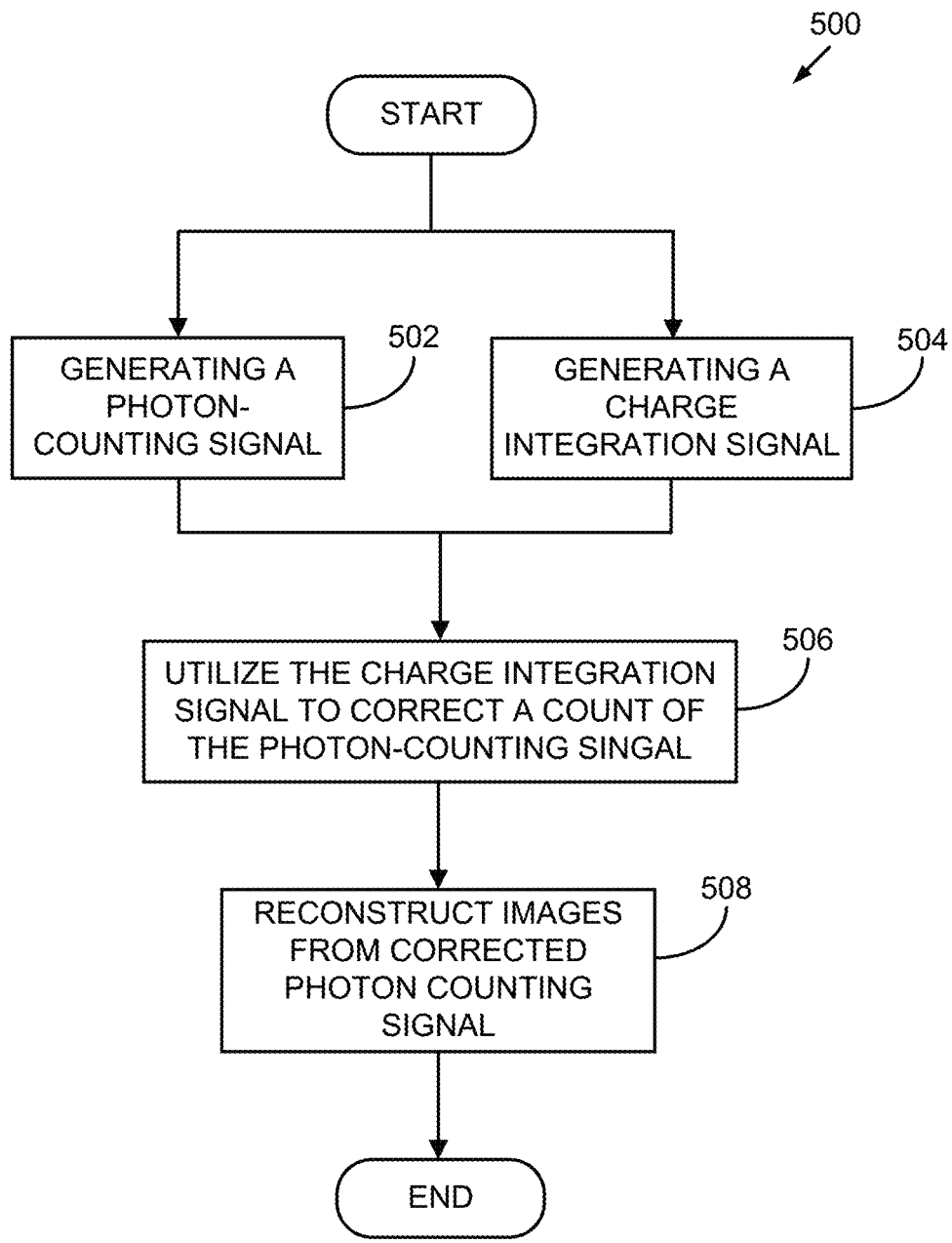
FIG. 5 is a flow chart setting forth some non-limiting example steps of a method in accordance with the present disclosure.

Using the above-described systems, a process for pileup correction can be performed. Some example steps of one non-limiting example of such a process 500 is illustrated in FIG. 5. In particular, the process 500 begins with receiving x-rays passing through an object with a photon-counting detector system to generate a photon-counting signal at block 502 and a charge integration signal at block 504. As described above, the charge integration signal is generated by summing a charge associated with each photon received at a given detector pixel of the plurality of pixels of the photon-counting detector system or a series of pixels. At process block 506, the charge integration signal is used to correct a count of the photon-counting signal for pileup-induced count losses and, thus, create a corrected photon-counting signal. Finally, at process block 508, an image of the object is reconstructed using the corrected photon-counting signal, such that the image has reduced effects of pileup compared to an image reconstructed from the photon-counting signal.

EXAMPLES

To experimentally demonstrate the feasibility of the system and methods provided herein, an experimental x-ray imaging benchtop system was created that included the architecture described above with respect to FIG. 2. The system was equipped with both an interchangeable CdTe-based PCD (Thor FX10, Direct Conversion AB, Sweden) and an CsI (TI)/aSi: H-based EID (4030CB, Varex Imaging, USA). The pixel pitch of the EID (194 μm) was approximately 2 times that of the PCD (100 μm), which allowed for the emulation of a 2-by-2 pixel block charge integration scheme. The PCD was operated under the anti-coincidence mode with a deadtime of approximately 740 ns.

The x-ray source in the system was a rotating tungsten anode angiographic tube (G-1592 with B-180H housing, Varian Medical Systems, USA) powered by an 80 kW high-frequency generator (Indico 100, CPI Inc., Canada). The tube was operated at 70 kVp under the radiographic mode. The tube current (mA) was adjusted from 0.5 to 200 mA to obtain different x-ray flux levels at the detector surface. At each mA level, we first irradiated the PCD and recorded its counts, then we replaced the PCD by the EID and irradiated it under the identical condition. The outputs of the EID were used to emulate the outputs of the above-described charge-integration system, namely the total charge accumulated over the time window (T) of each PCD image frame for each 2-by-2 PCD pixel block.

To establish the correction LUT, raw counts of the PCD (N) and the digital outputs of the EID (M) were repeatedly measured 50 times (for reducing statistical uncertainty) at each mA (flux) level. The desired linear PCD counts ($N_{true}$) were estimated by performing linear extrapolation of N measured at the five lowest mA levels where the expected pileup count loss was less than 1%.

Once the LUT was established, its utility and generalizability were tested using PMMA slabs of various thicknesses to determine the accuracy and linearity of log-normalized projection data with the true radiological path length, as well as with a high-contrast spatial resolution test pattern. When calling the LUT, its inputs were a single sample of N and M because those correspond to the information available in clinical practice. To evaluate the correction performance, we 1) plotted the uncorrected and corrected count rates against mA to examine the linearity and accuracy; 2) compared radiological path lengths of PMMA calculated from uncorrected and corrected counts via log-normalization; 3) compared uncorrected and corrected log-normalized projections of the spatial resolution test pattern to determine the correction's impact on spatial resolution.

FIG. 6A shows detected PCD counts as a function of mA without and with the proposed correction. After correction, the PCD counts are linear with flux level and are in agreement with the $N_{true}$ values estimated via a linear extrapolation of the low mA data points. FIG. 6B shows log-normalized projection data as a function of true radiological path length of PMMA. As the material thickness (path length) decreases, pulse-pileup-induced count losses become more severe and the measured path length artificially increases.

Figure 8:
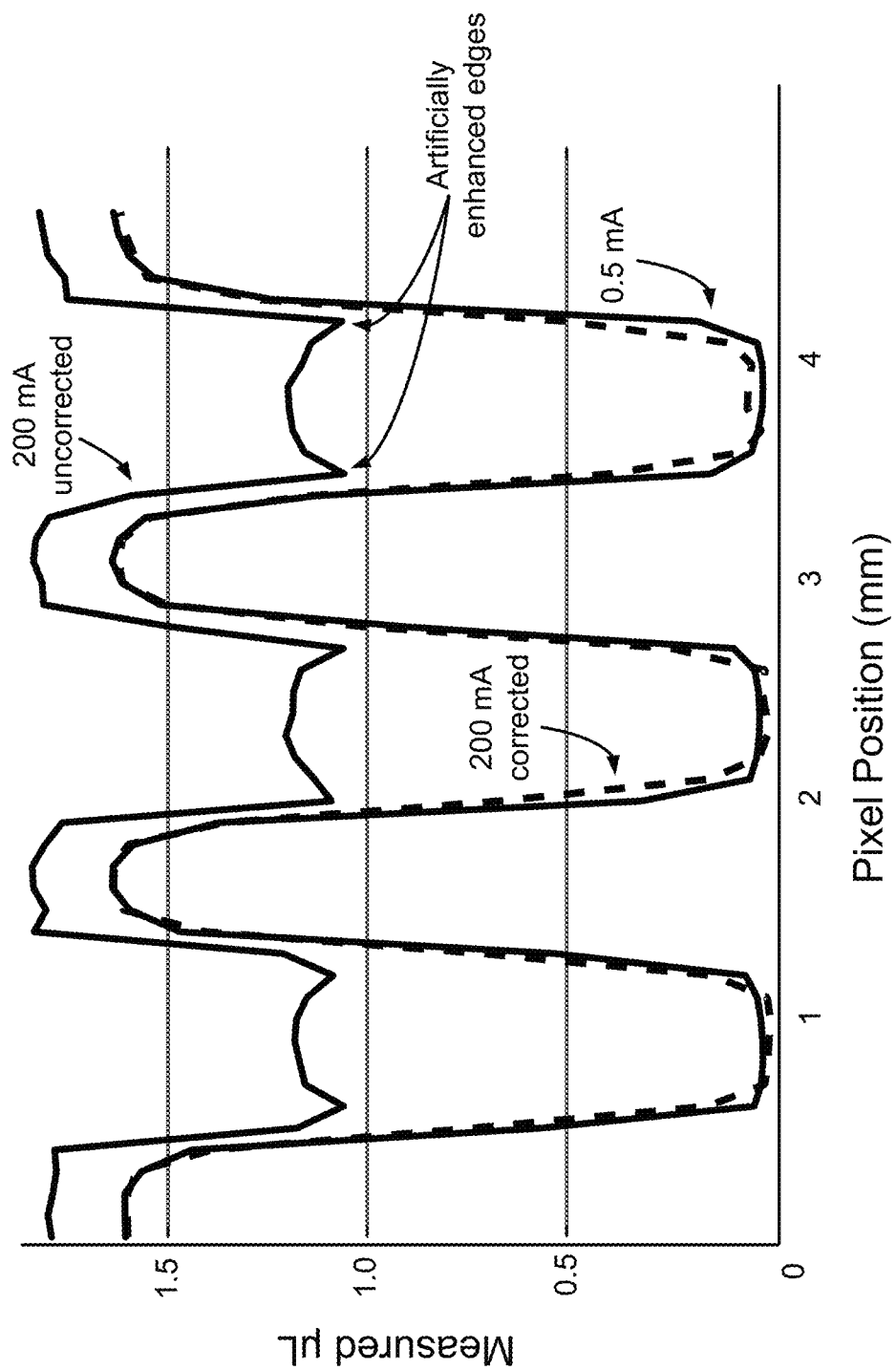
FIG. 8 is a graph showing measured line profiles through one of the bar patterns in FIG. 7.

After correction via the systems and methods described herein were applied, the measured path lengths agree with the true values. Images of the spatial resolution test pattern are shown in FIG. 7, and demonstrate that there is no loss of spatial resolution due to the correction. Line profiles through one of the bar patterns are shown in FIG. 8, and demonstrate that after the proposed correction, the measured path lengths again agree with the true values. Additionally, in the uncorrected images, there are artificially enhanced edges that are removed after the correction is applied.

Previous endeavors to reduce pileup-induced count losses usually require specialized hardware and circuit designs to either shorten the pulse processing time or alter the count trigger strategy. Algorithms have also been previously proposed to correct count losses, although, prior to the systems and methods of the present disclosure, it was not possible to address the degeneracy problem when the only information available was the single number of recorded counts. The systems and methods provided herein are able to utilizes information available in traditional PCD systems, so no changes to PC detectors are required. The systems and methods provided herein are able to assemble the total induced charge information and, recognizing that this information is linearly related to the true input flux for a given spectrum, control against pileup and associated degradation. The systems and methods provided herein do not require system modeling.

Thus, a charge-integration system can be used that is a low-cost addition of shared capacitors, amplifiers, and ADCs added to the existing ASIC. With this charge-integration system, the accumulated charges (information that others have not recognized has any value and is not assembled into a useable form to achieve the ends described herein) can be salvaged to supplement the pulse-mode counts for a better estimate of the true photon numbers. As described herein, this system was experimentally demonstrated as able to accurately estimate the true counts from pileup-distorted PCD counts and, thereby, correct the same.

As used herein, the phrase "at least one of A, B, and C" means at least one of A, at least one of B, and/or at least one of C, or any one of A, B, or C or combination of A, B, or C. A, B, and C are elements of a list, and A, B, and C may be anything contained in the Specification.

The present invention has been described in terms of one or more preferred embodiments, and it should be appreciated that many equivalents, alternatives, variations, and modifications, aside from those expressly stated, are possible and within the scope of the invention.

The invention claimed is:

1. A computed tomography (CT) medical imaging system comprising:
    an x-ray source configured to deliver x-rays to an object as the x-ray source is rotated about the object;
    a photon-counting detector system comprising a pixel or a plurality of detector pixels configured to receive the x-rays passing through the object and generate a photon-counting signal in response to receiving a photon of the x-rays having passed through the object;
    a charge-integration system configured sum a charge associated with each photon received at a given detector pixel of the plurality of pixels to generate a charge integration signal, wherein the charge-integration system is configured to receive a summed charge signal incorporating a local charge and at least one adjacent pixel from the photon-counting detector and integrate the summed charge signal over time to generate the charge integration signal;
    a processor configured to:
        utilize the charge integration signal to correct a count of the photon-counting signal for pileup-induced count losses to create a corrected photon-counting signal; and
        reconstruct an image of the object using the corrected photon-counting signal.

2. The system of claim 1, wherein the processor is configured to utilize a linear response of charge-integration operation to correct the count of the photon-counting signal.

3. The system of claim 2, wherein the processor is configured to access a look-up table correlating counts indicated by the photon-counting signal (N) and the charge integration signal (M) to the corrected photon-counting signal.

4. The system of claim 1, wherein the charge-integration system includes storage device configured to integrate the summed charge signal over time to generate the charge integration signal.

5. The system of claim 4, wherein the storage device is a capacitor.

6. The system of claim 1, wherein the charge-integration system is coupled to a block of pixels in the plurality of detector pixels.

7. The system of claim 6, wherein the charge-integration system is further configured to generate total charge accumulated over a time window (T) of each image frame for each block of pixels.

8. The system of claim 6, wherein the pixel block is 2-by-2 or 3-by-3.

9. The system of claim 6, wherein the charge-integration system is configured to sum the charge associated with each photon received in each pixel or across the block of pixels of the plurality of pixels to generate a charge integration signal.

10. A method for producing a computed tomography (CT) medical image including steps comprising:
  (a) receiving x-rays passing through an object with a photon-counting detector system comprising a pixel or a plurality of detector pixels configured to generate a photon-counting signal in response to receiving each photon of the x-rays having passed through the object;
  (b) summing a charge associated with each photon received at a given detector pixel of the plurality of pixels to generate a charge integration signal, wherein summing the charge includes receiving a summed charge signal incorporating a local charge and at least one adjacent pixel from the photon-counting detector and integrating the summed charge signal over time to generate the charge integration signal;
  (c) utilizing the charge integration signal to correct a count of the photon-counting signal for pileup-induced count losses to create a corrected photon-counting signal; and
  (d) reconstructing an image of the object using the corrected photon-counting signal.

11. The method of claim 10, further comprising utilizing a linear response of charge-integration operation to correct the count of the photon-counting signal.

12. The method of claim 11, further comprising accessing a look-up table correlating counts indicated by the photon-counting signal (N) and the charge integration signal (M) to the corrected photon-counting signal.

13. The method of claim 10, wherein summing the charge includes summing the charge signal over time to generate the charge integration signal.

14. The method of claim 10, wherein summing the charge includes summing across a block of pixels in the plurality of detector pixels.

15. The method of claim 14, wherein summing includes generating total charge accumulated over a time window (T) of each image frame for each block of pixels.

16. The method of claim 14, wherein the pixel block is 2-by-2 or 3-by-3.

17. The method of claim 10, performing steps (a) through (c) across a plurality of energy bins.

* * * * *